US009005549B2

(12) United States Patent
Jehle

(10) Patent No.: US 9,005,549 B2
(45) Date of Patent: *Apr. 14, 2015

(54) HIGH THROUGHPUT POLYMER-BASED MICROARRAY SLIDE

(75) Inventor: Heinrich Jehle, Linsenhofen (DE)

(73) Assignee: Greiner Bio-One GmbH, Frickenhausen (DE)

( * ) Notice: Subject to any disclaimer, the term of this patent is extended or adjusted under 35 U.S.C. 154(b) by 960 days.

This patent is subject to a terminal disclaimer.

(21) Appl. No.: 11/275,784

(22) Filed: Jan. 29, 2006

(65) Prior Publication Data

US 2006/0171856 A1 Aug. 3, 2006

Related U.S. Application Data

(63) Continuation-in-part of application No. 10/542,520, filed as application No. PCT/EP2004/000311 on Jan. 16, 2004, now Pat. No. 8,007,744.

(60) Provisional application No. 60/649,242, filed on Feb. 1, 2005.

(51) Int. Cl.
*B01L 3/00* (2006.01)
*G02B 21/34* (2006.01)

(52) U.S. Cl.
CPC ....... *B01L 3/5085* (2013.01); *B01L 2300/0636* (2013.01); *B01L 2300/0819* (2013.01); *B01L 2300/0822* (2013.01); *B01L 2300/168* (2013.01); *G02B 21/34* (2013.01)

(58) Field of Classification Search
CPC ................................. B01L 2300/168
USPC .................. 422/102, 104, 552, 551
See application file for complete search history.

(56) References Cited

U.S. PATENT DOCUMENTS

| | | | |
|---|---|---|---|
| 3,107,204 A | 10/1963 | Brown et al. | |
| 3,649,464 A | 3/1972 | Freeman | |
| 4,299,920 A | 11/1981 | Peters | |
| 4,319,841 A | 3/1982 | Suovaniemi et al. | |
| 4,493,815 A | 1/1985 | Fernwood et al. | |
| 5,516,490 A | 5/1996 | Sanadi | |
| 5,545,531 A | 8/1996 | Rava et al. | |
| 5,728,350 A | 3/1998 | Kinoshita et al. | |
| 5,792,653 A | 8/1998 | Weibezahn et al. | |
| 5,840,256 A | 11/1998 | Demers et al. | |
| 5,891,630 A | 4/1999 | Eggers et al. | |
| 5,922,289 A | 7/1999 | Wong | |
| 5,948,673 A | 9/1999 | Cottingham | |
| 7,063,979 B2* | 6/2006 | MacBeath et al. | 435/305.2 |
| 2002/0031449 A1 | 3/2002 | Loscher et al. | |
| 2003/0013130 A1 | 1/2003 | Charych et al. | |
| 2003/0231987 A1* | 12/2003 | Carmack et al. | 422/99 |
| 2003/0232427 A1* | 12/2003 | Montagu | 435/287.2 |
| 2004/0029303 A1 | 2/2004 | Hart et al. | |
| 2004/0086869 A1* | 5/2004 | Schembri | 435/6 |
| 2004/0208350 A1* | 10/2004 | Rea et al. | 382/128 |
| 2004/0257579 A1* | 12/2004 | Shirai et al. | 356/477 |

FOREIGN PATENT DOCUMENTS

| | | |
|---|---|---|
| DE | 29 02 026 A1 | 7/1980 |
| DE | 34 25 762 A1 | 2/1985 |
| DE | 33 36 738 A1 | 5/1985 |
| DE | 9105 550.4 | 8/1991 |
| DE | 91 07 670.6 | 9/1991 |
| DE | 41 32 379 A1 | 4/1993 |
| DE | 9692 28 291 T2 | 6/1999 |
| DE | 198 53 640 A1 | 6/2000 |
| DE | 199 04 784 A1 | 8/2000 |
| DE | 199 16 867 A | 10/2000 |
| DE | 299 23 461 U1 | 12/2000 |
| DE | 100 35 750 A1 | 2/2002 |
| DE | 100 49 902 A1 | 4/2002 |
| DE | 100 58 316 A1 | 6/2002 |
| DE | 101 05 711 A1 | 9/2002 |
| DE | 103 21 042 A1 | 8/2004 |
| EP | 0 329 120 | 8/1989 |
| EP | 0 454 046 A2 | 10/1991 |
| EP | 0 597 288 A1 | 5/1994 |
| EP | 0 818 828 A2 | 1/1998 |
| EP | 0816 828 A2 | 1/1998 |
| EP | 0 834 729 A2 | 4/1998 |
| EP | 1 069 181 A2 | 1/2001 |
| EP | 1 110 611 A1 | 6/2001 |
| EP | 1 148 942 B1 | 10/2002 |
| EP | 1 302 241 A2 | 4/2003 |
| EP | 0 976 453 B1 | 5/2004 |
| GB | 2 365 126 | 2/2002 |
| WO | WO 82/02958 | 9/1982 |
| WO | WO 88/08789 | 11/1988 |
| WO | WO 95/23026 | 8/1995 |
| WO | WO 97/13839 | 4/1997 |

(Continued)

OTHER PUBLICATIONS

Greiner Bio-One. Customer Drawing: AC 65500x. Jan. 12, 2005.*

(Continued)

*Primary Examiner* — Natalia Levkovich

(74) *Attorney, Agent, or Firm* — Vista IP Law Group LLP

(57) ABSTRACT

A microarray slide comprises a flat platform having a plurality of compartments thereon, the compartments having a bottom and a sidewall extending from the bottom. The platform and compartments are formed of a polymer material, such as polystyrene or cycloolefin, or other plastic material. The sidewall has a low profile such that the ratio of the surface area of the bottom to the height of the sidewall is greater than 30. In another aspect of the invention, the top surface of the slide is coated with a layer of reflective material such as aluminum, gold, chromium or other suitable reflective material. The layer of reflective material may be coated with a layer of protective coating, to prevent corrosion or other damage to the reflective layer and to functionalize the surface.

17 Claims, 3 Drawing Sheets

(56) References Cited

FOREIGN PATENT DOCUMENTS

| | | |
|---|---|---|
| WO | WO 98/23957 | 6/1998 |
| WO | WO 98/23957 A | 6/1998 |
| WO | WO 98/41323 | 9/1998 |
| WO | WO 98/45406 | 10/1998 |
| WO | WO 99/64157 | 12/1999 |
| WO | WO 00/16082 | 3/2000 |
| WO | WO 02/057665 A2 | 7/2002 |
| WO | WO 02/063304 A3 | 8/2002 |
| WO | WO 02/077152 A1 | 10/2002 |
| WO | WO 02/086452 A2 | 10/2002 |
| WO | WO 2004/005477 A2 | 1/2004 |
| WO | WO 2004/065009 A1 | 8/2004 |

OTHER PUBLICATIONS

Integrated Publishing, Corrosion of Aluminum, Jan. 28, 2004, Web Archive <http://web.archive.org/web/20040128122845/http://www.tpub.com/content/doe/h1015v1/css/h1015v1_120.htm>, 1 Page.*

English Translation of Preliminary Report on Patentability for PCT/EP2004/000311, Dec. 1, 2005. (4 Pages).

STN Easy English Translation of Abstract of DE 197 30 445 A1, Mar. 2, 1999. (1 Page).

eScience Abstract of WO 2002242824, Jul. 30, 2002. (1 Page).

STN Easy English Translation of Abstract of DE 33 36 738 A1, Sep. 25, 1993, (1 Page).

STN Easy English Translation of Abstract of DE 10049 902 A1, Oct. 10, 2000. (1 Page).

PCT International Search Report for PCT/EP2006/000863, Applicant: Greiner Bio-One Gmbh, Form PCT/ISA/210 and 220, dated May 30, 2006 (7 pages).

PCT VVritten Opinion for PCT/EP2006/000863, Applicant: Greiner Bio-One Gmbh, Form PCT/ISA/237, dated May 30, 2006 (7 pages).

* cited by examiner

| Normal | | | | |
|---|---|---|---|---|
| SNR 532 | F532 Mean | SNR 635 | F532 Mean | Bac |
| 280.912 | 18.079 | 248.888 | 7.652 | POS+ |
| 151.408 | 8.119 | 88.035 | 2.094 | Td |
| 150.681 | 10.365 | 139.110 | 3.649 | Ec |
| 179.488 | 12.267 | 74.207 | 1.868 | Cr |
| 100.588 | 5.999 | 129.440 | 3.046 | Pi |
| 122.016 | 8.890 | 103.975 | 2.665 | Bf |
| 145.523 | 10.007 | 115.775 | 2.853 | Pg |
| 117.246 | 8.397 | 84.429 | 2.027 | Av |
| 146.505 | 9.101 | 72.606 | 1.828 | Pm |
| 144.666 | 8.623 | 129.305 | 3.200 | Fn |
| Alu | | | | |
| 370.864 | 62.823 | 280.137 | 21.117 | AluPOS+ |
| 332.744 | 61.121 | 342.032 | 10.344 | AluTd |
| 319.721 | 59.626 | 383.388 | 12.962 | AluEc |
| 343.517 | 60.076 | 303.115 | 7.631 | AluCr |
| 237.726 | 46.770 | 447.045 | 13.953 | AluPi |
| 301.145 | 63.922 | 476.262 | 12.942 | AluBf |
| 304.328 | 60.237 | 386.120 | 12.213 | AluPg |
| 291.867 | 50.068 | 387.555 | 9.845 | AluAv |
| 399.234 | 58.432 | 313.400 | 7.299 | AluPm |
| 292.179 | 60.204 | 458.208 | 12.735 | AluFn |

HIGH THROUGHPUT POLYMER-BASED MICROARRAY SLIDE

This is a continuation-in-part of U.S. patent application Ser. No. 10/542,520, filed Jul. 14, 2005, now U.S. Pat. No. 8,007,744 which is a U.S. National Stage of International Patent Application No. PCT/EP2004/000311, filed Jan. 16, 2004, which claims priority to German Patent Application No. 103 21 042.3, filed May 10, 2003, and to German Patent Application No. 103 02 341.0, filed Jan. 17, 2004. Priority to each of the aforementioned applications is hereby expressly claimed in accordance with 35 U.S.C. §§119, 120, 365, 371 and any other applicable statutes. The benefit of U.S. Provisional Patent Application No. 60/649,242, filed Feb. 1, 2005, is also hereby claimed. The contents of each of the aforementioned applications are hereby incorporated herein by reference in their entirety.

FIELD OF THE INVENTION

The field of the invention generally relates to microarray slides, and more particularly to polymer-based slides used in biomolecular assays, and methods of making the same.

BACKGROUND OF THE INVENTION

Microarrays for biomolecular assays are typically formed on glass slides. The arrays may be formed of DNA (or other polynucleotide forms such as cDNA or RNA). The arrayed DNA may be synthesized on the glass slide, or robotically dispensed onto the slide into an array format.

Glass slides have been the substrate of choice for microarrays because glass has desirable structural, optical and chemical properties. For example, glass has sufficient rigidity and hardness for maintaining uniform flatness and withstanding unwanted bending. Moreover, glass exhibits very low fluorescent background in the most relevant excitation and emission wavelength ranges for biomolecular assays. Finally, glass is chemically resistant to the reagents generally used in biomolecular assays. A typical glass slide is shown in FIG. 1.

However, glass slides have several significant drawbacks. Glass is fragile and breakable when subjected to undesired impacts, such as from dispensing equipment. Additionally, glass slides do not allow for high throughput applications because a glass slide accommodates only a single assay site. This is because there are no physical barriers on the slide to prevent cross-contamination of multiple assay sites. Accordingly, in many cases, most of the surface of a glass slide goes unused, especially in low and medium density arrays.

Therefore there is a need for a microarray slide which overcomes the aforementioned problems with glass slides and which allows for high throughput by accommodating multiple assay sites on a single slide.

SUMMARY OF THE INVENTION

The basic technological problem that underlies the present invention is to provide an analysis sample container, in particular one for biomolecular assays, patient-specific clinical and chemical tests, that can be used in particular as a biochip after biologically active molecules have been immobilized and that overcomes the disadvantages known in the prior art and permits clinical parameters to be determined quickly and reliably, whereby in particular it is possible to detect relevant clinical/chemical parameters quantitatively and free of errors utilizing automated detection technology.

The present invention solves the underlying technical problem by providing a biochip (microarray) platform comprising a platform plate having at least one three-dimensional reaction chamber, whereby the reaction chamber and the volume of the reaction chamber, which is open facing upward, is defined by laterally enclosing side walls, whereby the ratio of the surface area of the bottom to the height of the side walls is greater than or equal to 30, preferably greater than 50. The bottom and/or at least one side wall of at least one reaction chamber is embodied as a binding matrix having a functional group that makes it possible to bind a natural or synthetic molecule, in particular a biologically active molecule.

More particularly, in the present invention the ratio of the numerical value of the surface area of the bottom, which is expressed in mm2, to the numerical value of the height of the side walls, which is expressed in mm, measured at the lowest part of the preferably flat bottom to the upper edge of the side wall, preferably is greater than or equal to 30, 35, 40, 45, 50, 60, 70, 80, or 90. Preferably, the ratio of the numerical value of the bottom surface area to the numerical value of the height of the side walls is 30 to 100, and more preferably between 32 and 80. Even more preferably, the ratio of the magnitude of the bottom surface area to the height of the side walls is greater than or equal to 50. In addition, it is preferable in actual experience that the upper edges of the side walls of the reaction chamber form the highest part of the biochip platform.

The biochip platform of the invention therefore comprises a platform plate and at least one three-dimensional reaction chamber, and the reaction chamber is constructed of a bottom and side walls which laterally encompass the volume of the reaction chamber and close it off, and the reaction chamber has an opening in the upward direction, preferably with the same surface area and geometry as the bottom, and the ratio between the surface area (S) of the bottom and the height of the side walls, which is described above, preferably is greater than or equal to 30, preferably greater than 50.

The present invention therefore provides a biochip platform on which at least one, however in other preferred embodiments a plurality of, reaction chambers or cavities, is/are disposed, and the reaction chamber or the reaction chambers have a relatively large bottom surface area relative to their height. In the prior-art microplate systems, the ratio between the surface area of the bottom of the cavity and its height is less than 5 and therefore is substantially less than that in the biochip platform of the present invention.

The substantially increased ratio between the surface area of the bottom of the reaction chamber and the height of the side walls that is provided for in the present invention has the advantage that, even though the volume of the reaction chamber is small, a large surface is provided that has numerous binding sites in order to immobilize biologically active molecules and therefore to perform reactions. In addition, the reaction chamber of the invention permits a substantially improved evaluation of the tests performed in the reaction chamber using conventional detection systems, since the sources of errors caused by the dimensions of conventional wells, which tend to distort the measurement values, are eliminated. Because of their low depth, the reaction chambers of the invention permit a conventional scanner or some other conventional detection device to be positioned vertically over or vertically within the opening in the reaction chamber at an angle of 90° and then to perform the corresponding measurement. In contrast to conventional microtiter plates, this means that there are no shadowing effects, which could result in errors in the acquired measurement values. Because of their low depth, the reaction chambers of the biochip platform of the invention also make it possible, for example, to easily apply a nucleic acid to the bottoms of the individual reaction chambers using a conventional spotter, without having to insert the spotter very deeply into a reaction chamber.

In contrast to conventional biochips, in which biological molecules are applied to a planar level platform, in particular a glass platform, in the form of spots, and in which no defined reaction chambers or separate reaction chambers are present, the biochip platform of the invention is compartmentalized in the form of at least one single defined reaction chamber or in other embodiments a plurality or a large number of separate reaction chambers. The biochip platform therefore can also be used for reactions with reactants that are exclusively in solution, and in which, as needed, different reactions can be performed with different reactants. Furthermore, the biochip carriers of the invention can also be used to perform reactions in which at least one reactant is bonded to the surface of the bottom of the reaction chamber. In contrast to conventional biochips, because of the compartmentalization of the biochip platform of the invention, different reactions with the same or different bonded reactants can be performed as needed in the individual reaction chambers of the biochip platform of the invention. Since the reaction chambers of the biochip platform of the invention are embodied as separate cavities, it is possible, for example, in the individual reaction chambers of a biochip platform of the invention to simultaneously perform different nucleic acid hybridizations with different nucleic acids and/or different protein-protein binding reactions with different proteins, without these individual reactions interfering with each other. In contrast to the biochip platform of the invention, a conventional, non-compartmentalized biochip does not afford this opportunity. Thus, the biochip platform of the present invention advantageously combines the advantages of chip technology with the advantages of microtiter plate technology.

The biochip platform of the invention is especially suitable for performing patient-specific nucleic acid analyses or protein analyses. It is provided for in the invention, for example, that the bottom surface of the reaction chambers of the biochip carrier of the present invention is functionalized with chemical groups that permit a binding of biological molecules, in particular of nucleic acid probes having a known nucleic acid sequence or with proteins having a known amino acid sequence. By immobilizing biologically active molecules and using the biochip platform of the invention having functionalized reaction chambers, it is possible to produce a biochip which, for example, permits a multitude of diagnostic nucleic acid hybridizations or nucleic acid protein binding reactions or protein-protein binding reactions to occur.

Moreover, the invention provides that in one embodiment of the invention, the biochip platform of the invention has dimensions that permit the biochip platform of the invention to be inserted into a conventional microtiter plate having standard SBS (Society of Bimolecular Screening) dimensions. In one embodiment the biochip platform of the invention is constructed in the form of a strip whose length permits insertion into a microtiter plate that complies with the SBS standards, while the width of the strip may be varied. The strip configuration of the biochip of the invention is extremely advantageous, particularly in clinical diagnostics, for example for acquiring the clinical chemical parameters of an individual patient. The reaction chambers can be arranged linearly in rows on a strip, and a plurality of rows can be arranged next to each other on each strip.

In one aspect of the present invention, a microarray slide comprises a flat platform having a plurality of compartments thereon. The platform and compartments are formed of a polymer material, such as polystyrene or cycloolefin, or other plastic material. The slide with compartments thereon is typically injection molded.

In another aspect of the invention, the top surface of the slide is coated with a layer of reflective material such as aluminum, gold, chromium or other suitable reflective material. The layer of reflective material may be coated with a layer of protective coating, to prevent corrosion or other damage to the reflective layer.

In another aspect of the invention, the reflective layer and/or protective coating may be applied to any polymer multi-well microplate.

DETAILED DESCRIPTION OF THE INVENTION

Figure 2:
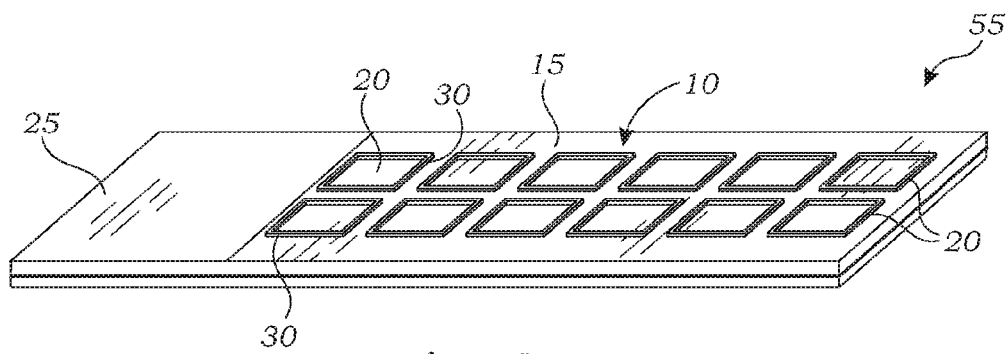
FIG. 2 is a side perspective view of a slide according to the present invention.

A microarray slide 5 according to the present invention is shown in FIG. 2. The slide 5 is similar to the high throughput array slide described in International Patent Application No. PCT/EP/2004/000311, and the related description therein is incorporated herein by reference in its entirety.

Figure 1:
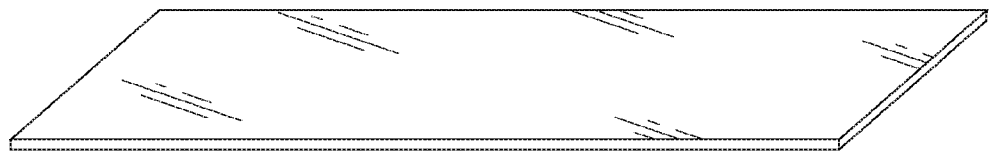
FIG. 1 is side perspective view of a typical glass slide.

The slide 5 comprises a polymer-based platform 10 having an upper surface 15 and compartments 20 on the upper surface 15. Unlike the glass slide of FIG. 1, the platform 10 in FIG. 2 has the plurality of compartments 20 thereon, for receiving a plurality of corresponding assays. The compartments 20 are arranged in any convenient relationship to each other. FIG. 2 shows twelve compartments 20 as square-shaped, and uniformly spaced in two adjacent columns. Other arrangements may be used, with other amounts of compartments, such as 96, 384, or more compartments. The platform 10 also has a handling area 25 for manual or automated handling without contacting or otherwise contaminating the area of the compartments 20. The platform 10 is typically injection-molded and is made of a polymer material, such as polystyrene, cycloolefin, or other plastic material.

The platform 10 may have the standard dimensions of a glass microarray slide, such as a length of 75 mm and a width of 25 mm. Other standard slide dimensions are also contemplated. The compartments 20 are square and each side may be 6 mm for the standard size slide, with a compartment to compartment pitch of 9 mm. Again, other amounts, dimensions, shapes and spacing of compartments 20 may be utilized within the bounds of the present invention.

The compartment walls 30 define the perimeter of each compartment 20. The walls 30 are preferably between 0.10 mm to 1.00 mm high, or more preferably between 0.25 mm and 0.75 mm and more preferably approximately 0.50 mm. The walls 30 provide the physical barrier to retain reagents within the compartment 20 and prevent cross-contamination with the reagents in the other compartments 20.

The slide 5 allows for multiple assays on a single slide and further provides an improved slide over the glass slides described above. However, the polymers and additives used in typical polymers used to make the slide 5 may produce higher than desired background fluorescence (for example, see FIG. 8).

Figure 3:
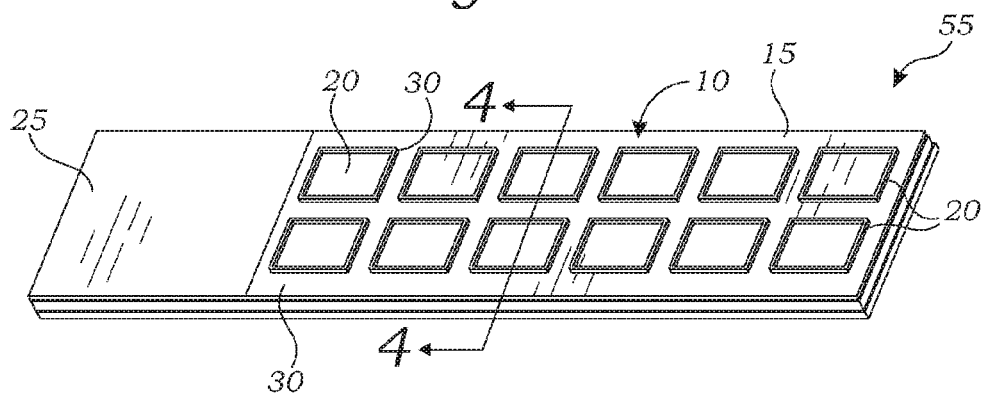
FIG. 3 is a side perspective view of a slide having a reflective coating and a protective coating according to the present invention.

Accordingly, in another aspect of the present invention, the slide 5 may also have a reflective coating 35 applied to the upper surface 15 (also called a mirrored slide herein) and the compartments 20 as shown in the slide 55 of FIG. 3. Alternatively, the reflective coating 35 may be applied to the bottom surface (not shown) of the platform 15. The slide 55 is identical to the slide 5 described above except for the coatings, and like reference numerals refer to like elements in FIGS. 2 and 3.

Figure 4:
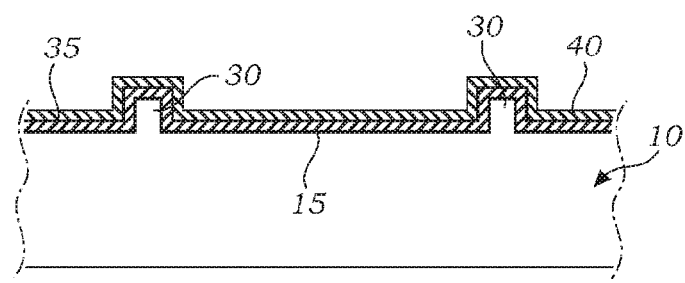
FIG. 4 is a partial schematic cross-sectional view of the slide in FIG. 3, along line 4-4.

Turning to FIG. 4, a partial schematic cross-sectional view of the slide 55 of FIG. 3, along line 4-4, is shown. This drawing is not to scale, but is for illustration of the thin coatings which may be applied to the slide 5. The reflective coating 35 results in decreased fluorescent background of the slide 55. The reflective coating 35 may be a layer of aluminum, gold, chromium or other suitable reflective material.

The reflective coating 35 may be applied by high vacuum deposition. The deposition is performed in high vacuum (better than $10^{-4}$ mbar) with low melting high purity aluminium in well-known standard procedures. This procedure is necessary to keep the thermal stress of polymer articles low during the application of the aluminium. With other techniques (which work at high temperatures) the low melting polymer-based articles may be damaged or destroyed.

The layer of reflective material may be coated with a layer of protective coating 40, to prevent corrosion or other damage to the reflective layer. The protective layer 40 needs to be very stable to prevent the metal surface from contact with oxidizing reagents. For example, the protective coating 40 may be a deposition of polydimethylsiloxane applied via plasma polymerization.

In addition, the surface of the protective coating 40 may be further processed, treated or coated for surface functionalization. The surface functionalization prepares the surface so that it may immobilize an array of biomolecules to the surface. The use of the organosilicon compound polydimethylsiloxane offers the chance to follow other and more synthetic pathways (e.g. photochemistry, radical chemistry, plasma techniques) for surface functionalization than the usual SOL GEL Chemistry which is used in glass biochip slides. The surface functionalization of the protective coating 40 may be performed with the GBO 3-D Amino surface. A PARO Check™ may afterwards be processed and compared with a simultaneously processed (under identical conditions) PARO Check™ of a conventional transparent slide including hybridization.

Experiment 1

In this experiment, the performance characteristics of a polymer-based slide 5 without coatings were compared to a slide 55 having the reflective coating 35 and the protective coating 40. The slide 5 and slide 55 in this experiment have substantially identical platforms 10 made of the same polymer, namely cycloolefin copolymer.

The slide 55 was coated with reflective layer 35 comprising a one micrometer layer of aluminium applied by high vacuum deposition. The protective coating 40 was applied over the aluminium layer 35 and comprised a 0.2 micrometer layer of polydimethylsiloxane [$(CH_3)_2SiO$]$_n$ applied by plasma polymerization.

The two slides 5 and 55 were then each spotted with immobilized Cy3 and Cy5 labelled biomolecules including various oligonucleotides, polynucleotides and cDNA. It was found that the slide 55 having the reflective layer 35 and protective coating 40 proved to have significantly lower background fluorescence and higher signal intensities (and signal to background ratios).

Figure 5:
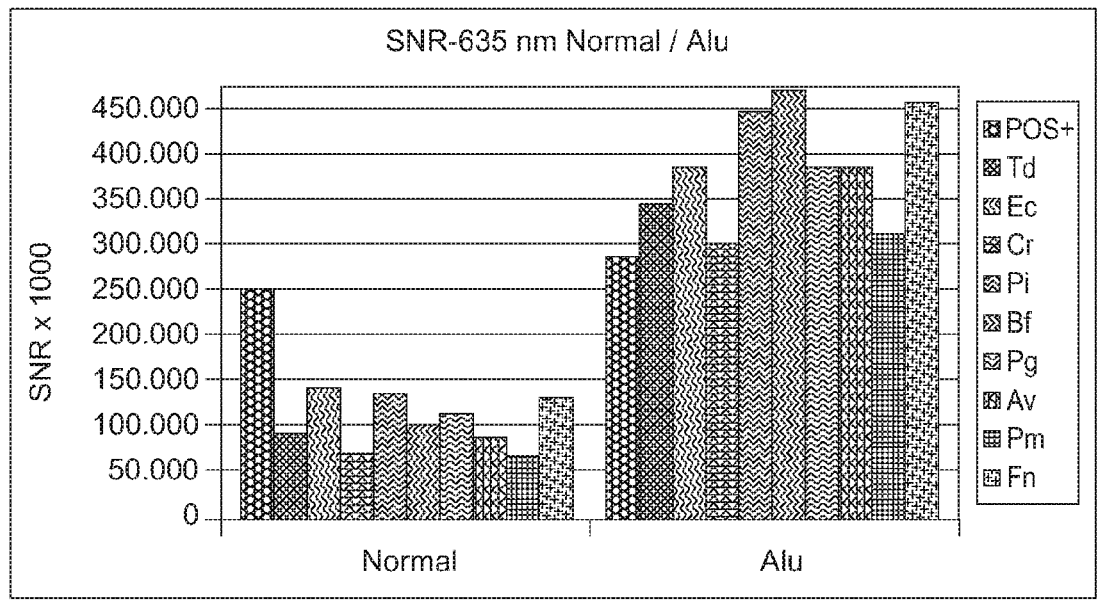
FIG. 5 is a bar chart comparing the signal-to-noise ratios of a transparent slide (labeled "Normal") to a mirrored slide (labeled "Alu") (namely, coated with aluminum) according to the present invention.

Referring to FIG. 5, the bar chart compares the signal-to-noise ratios (SNR) of the slide 5 (labeled "Normal") to the slide 55 (labeled "Alu"). The readings were taken at an excitation wavelength of 635 nm and an emission wavelength of 678 nm. It can be seen that the signal to noise values for the slide 55 with the aluminum reflective layer 35 has a higher signal-to-noise ratio than the uncoated slide 5 for all of the tested biomolecules. The signal-to-noise ratio of the slide 55 was higher than that of the slide 5, in some cases by more than 200%, in some cases by more than 300% and in some cases by more than 400%.

Figure 6:
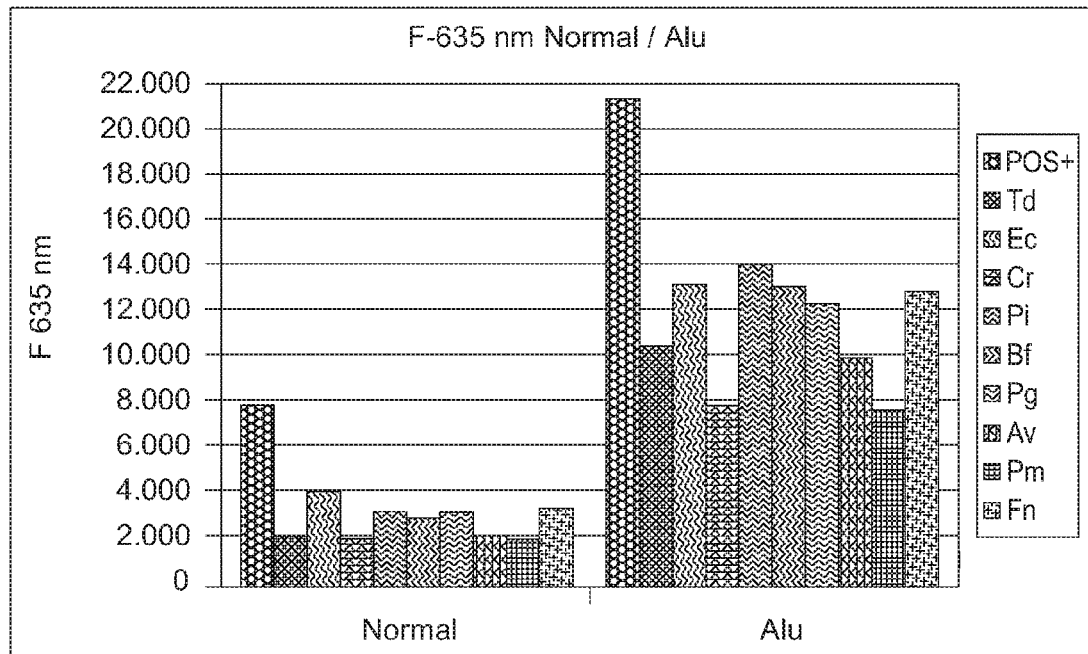
FIG. 6 is a bar chart comparing the signal intensities of a transparent slide compared to a mirrored slide according to the present invention.

FIG. 6 shows a bar chart comparing the signal intensities of the slide 5 (labeled "Normal") as compared to the slide 55 (labeled "Alu"). Again, the readings were taken at an excitation wavelength of 635 nm and an emission wavelength of 678 nm. It can be seen that the signal intensity for the slide 55 with the aluminum reflective layer 35 was higher than the signal intensity of the uncoated slide 5 for all of the tested biomolecules. The signal intensity of the slide 55 was higher than that of the slide 5, in some cases by more than 200%, in some cases by more than 300% and in some cases by more than 400%.

Figures 7, 8:
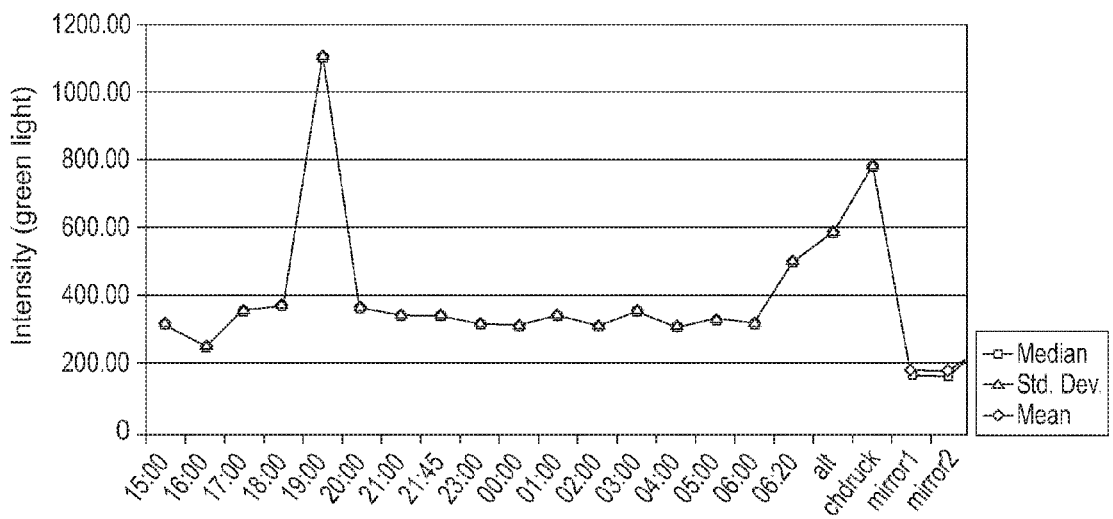
FIG. 7 is a summary table showing signal-to-noise ratio and signal intensity for two different sets of emission and excitation wavelengths for a transparent slide compared to a mirrored slide.
FIG. 8 is an X-Y graph showing background fluorescence of transparent slides of differing production conditions compared with mirrored slides (namely, coated with aluminum).

FIG. 7 is a summary table showing the signal-to-noise ratio and signal intensity values for the slide 5 (Normal) and slide 55 (Alu) at two different sets of excitation wavelengths (532 nm and 635 nm) and emission wavelengths (580 nm and 678 nm, respectively). Consistent with the above charts, it can be seen that the signal-to-noise ratios and signal intensities for the slide 55 (Alu) were higher than for the slide 5 at both sets of excitation and emission wavelengths for all of the test biomolecules.

FIG. 8 is a graph showing background fluorescence of various uncoated slides 5 having differing production conditions (such as mold temperatures and pressures) compared with slides 55 having a reflective layer 35 (namely, coated with aluminum). The graph shows that the fluorescent background of the slides 55 having the aluminium layer is much lower than the fluorescent background of the uncoated slides 5.

In a further aspect of the present invention, the reflective coating 35 may be applied to any type of microplate, including the microplates described in U.S. Pat. No. 6,514,464, issued Feb. 4, 2003 to Knebel, and titled "Microplate With Transparent Base", the contents of which is hereby incorporated by reference herein in its entirety. The manufacturing processes for making the plates described in U.S. Pat. No. 6,514,464, may also be used, with the added steps of vacuum deposition of the reflective layer 35 and/or plasma polymerization of the protective layer 40.

What is claimed is:

1. A microarray slide comprising:
a polymer-based platform having an upper surface and a plurality of compartments on the upper surface, each of said compartments having a bottom formed by said upper surface of the platform and a sidewall extending from said bottom, wherein a top edge of the sidewall forms the highest part of the polymer-based platform each said bottom having a surface area measured in millimeter$^2$, and said sidewall having a height above said bottom measured in millimeter, wherein the ratio of the numerical value of said surface area of each said bottom to the numerical value of said height of said sidewall is greater than 30, a bottom surface of each of said compartments being functionalized with chemical groups for binding of biological molecules;
a layer of reflective material coating said upper surface, said reflective material selected from the group consisting of aluminum, gold and chrome; and
a layer of polydimethylsiloxane coating said layer of reflective material as a protective coating.

2. The microarray slide of claim 1 wherein said layer of reflective material provides a mirrored surface.

3. The microarray slide of claim 2 wherein said platform and said plurality of compartments are integrally formed of a single polymer material.

4. The microarray slide of claim 1 wherein the plurality of compartments occupy a first portion of the upper surface, and a handling area occupies a second portion of the upper surface.

5. The microarray slide of claim 4, wherein each of the plurality of compartments has substantially the same surface area.

6. The microarray slide of claim 1, wherein the plurality of compartments comprises exactly twelve compartments.

7. The microarray slide of claim 1, wherein each of the plurality of compartments has a substantially square-shaped cross section.

8. The microarray slide of claim 1 wherein the ratio of the numerical value of said surface area of said bottom to the numerical value of said height of said sidewall is greater than 30.

9. The microarray slide of claim 1 wherein the ratio of the numerical value of said surface area of said bottom to the numerical value of said height of said sidewall is greater than 50.

10. The microarray slide of claim 1 wherein the ratio of the numerical value of said surface area of said bottom to the numerical value of said height of said sidewall is greater than 90.

11. The microarray slide of claim 1 further comprising a binding region on said bottom for binding at least one chemical entity.

12. The microarray slide of claim 11 wherein said binding area comprises at least a portion of said bottom that is functionalized.

13. The microarray slide of claim 1 wherein the number of said compartments is an integer multiple of 8.

14. The microarray slide of claim 1 wherein the number of said compartments is an integer multiple of 12.

15. A microarray slide comprising:
a polymer-based platform having an upper surface, said upper surface having a layer of reflective material coating said upper surface;
a layer of polydimethylsiloxane coating said layer of reflective material as a protective coating, said reflective material selected from the group consisting of aluminum, gold and chrome; and
a plurality of compartments on the upper surface, the platform and the compartments being integrally formed of a single polymer material, each of said compartments having a bottom formed by said platform and a sidewall extending from said bottom, wherein a top edge of the sidewall forms the highest part of the polymer-based platform and compartments, each said bottom having a surface area measured in millimeter$^2$, a bottom surface of each of said compartments being functionalized with chemical groups for binding of biological molecules; said sidewall having a height above said bottom measured in millimeter, wherein the ratio of the numerical value of said surface area of said bottom to the numerical value of said height of said sidewall is greater than 30, and said sidewall having a height above said bottom of between 0.25 millimeters and 0.75 millimeters.

16. A microarray slide comprising:
a polymer-based platform having an upper surface;
a plurality of compartments on the upper surface, the platform and the compartments being injection molded integrally of a single polymer material, each of said compartments having a bottom formed by said platform and a sidewall extending from said bottom, wherein a top edge of the sidewall forms the highest part of the polymer-based platform and compartments, each said bottom having a surface area measured in millimeter$^2$, a bottom surface of each of said compartments being functionalized with chemical groups for binding of biological molecules; and said sidewall having a height above said bottom measured in millimeter, and said sidewall having a height above said bottom of between 0.25 millimeters and 0.75 millimeters;
a layer of reflective material coating said upper surface; said reflective material selected from the group consisting of aluminum, gold and chrome; and
a layer of polydimethylsiloxane coating said layer of reflective material as a protective coating.

17. The microarray slide of claim 16 wherein the plurality of compartments occupy a first portion of the upper surface, and a handling area occupies a second portion of the upper surface.

* * * * *